(12) United States Patent
Ulbricht et al.

(10) Patent No.: US 10,832,487 B1
(45) Date of Patent: Nov. 10, 2020

(54) DEPTH MAP GENERATION

(71) Applicant: Apple Inc., Cupertino, CA (US)

(72) Inventors: Daniel Ulbricht, Sunnyvale, CA (US); Amit Kumar K C, Sunnyvale, CA (US); Angela Blechschmidt, San Jose, CA (US); Chen-Yu Lee, Sunnyvale, CA (US); Eshan Verma, Mountain View, CA (US); Mohammad Haris Baig, San Jose, CA (US); Tanmay Batra, Mountain View, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 16/580,172

(22) Filed: Sep. 24, 2019

Related U.S. Application Data

(60) Provisional application No. 62/737,433, filed on Sep. 27, 2018.

(51) Int. Cl.
| | |
|---|---|
| *G06T 19/00* | (2011.01) |
| *G06T 7/50* | (2017.01) |
| *G06T 7/11* | (2017.01) |
| *G02B 27/01* | (2006.01) |
| *G06F 3/01* | (2006.01) |
| *G06T 7/30* | (2017.01) |

(52) U.S. Cl.
CPC ............ *G06T 19/006* (2013.01); *G02B 27/01* (2013.01); *G06F 3/011* (2013.01); *G06T 7/11* (2017.01); *G06T 7/30* (2017.01); *G06T 7/50* (2017.01)

(58) Field of Classification Search
None
See application file for complete search history.

(56) References Cited

U.S. PATENT DOCUMENTS

| | | | |
|---|---|---|---|
| 9,525,858 B2 | 12/2016 | Schwarz et al. | |
| 9,736,449 B1 * | 8/2017 | Fan | ........................ H04N 13/128 |
| 2003/0228034 A1 * | 12/2003 | Fox | ........................... G06T 7/55 |
| | | | 382/106 |
| 2016/0012567 A1 | 1/2016 | Siddiqui et al. | |
| 2017/0272724 A1 | 9/2017 | Lim | |
| 2018/0130210 A1 | 5/2018 | Hall | |

* cited by examiner

*Primary Examiner* — Frank S Chen
(74) *Attorney, Agent, or Firm* — Fernando & Partners, LLP

(57) ABSTRACT

In one implementation, a method of generating a depth map is performed by a device including one or more processors, non-transitory memory, and a scene camera. The method includes generating, based on a first image and a second image, a first depth map of the second image. The method includes generating, based on the first depth map of the second image and pixel values of the second image, a second depth map of the second image.

20 Claims, 7 Drawing Sheets

700

| 710 | Capture, from a first perspective, a first image of a scene, the first image including a plurality of first pixels having a respective plurality of first pixel values |

| 720 | Capture, from a second perspective different than the first perspective, a second image of the scene, the second image including a plurality of second pixels having a respective plurality of second pixel values |

| 730 | Generate, based on the first image and the second image, a sparse depth map of the second image including, for each of a subset of the plurality of second pixels, a depth of the scene for the respective second pixel |

| 740 | Generate, based on the sparse depth map of the second image and the respective plurality of second pixel values, a dense depth map of the second image including, for each of the respective plurality of second pixels, a depth of the scene for the respective second pixel |

| 750 | Capture a third image of the scene, the third image including a plurality of third pixels having a respective plurality of third pixel values |

| 760 | Generate, based on the dense depth map of the second image and the third image, a sparse depth map of the third image including, for each of a subset of the plurality of third pixels, a depth of the scene for the respective third pixel |

Figure 7

DEPTH MAP GENERATION

CROSS-REFERENCE TO RELATED APPLICATIONS

This application claims priority to U.S. Provisional Patent App. No. 62/737,433, filed on Sep. 27, 2018, which is hereby incorporated by reference in its entirety.

TECHNICAL FIELD

The present disclosure generally relates to generating a depth map, and in particular, to systems, methods, and devices for generating a depth map based on a sparse depth map and an image.

BACKGROUND

A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

In contrast, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands).

A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects.

Examples of CGR include virtual reality and mixed reality.

A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment. In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground.

Examples of mixed realities include augmented reality and augmented virtuality.

An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.

An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

An augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

There are many different types of electronic systems that enable a person to sense and/or interact with various CGR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

To provide a CGR experience based on a physical environment, the distance between a camera imaging the physical environment (referred to as a scene camera) and various objects in the scene may be useful. Various implementations determine the distance from the scene camera to a small number of points in the physical environment in the form of sparse depth map. Accordingly, to improve the CGR experience, various implementations disclosed herein determine the distance to many more points in the physical environment in the form of a dense depth map based on the sparse depth map and an image of the physical environment.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

FIG. 7 is a flowchart representation of a method of generating a depth map in accordance with some implementations.

Figure 1:
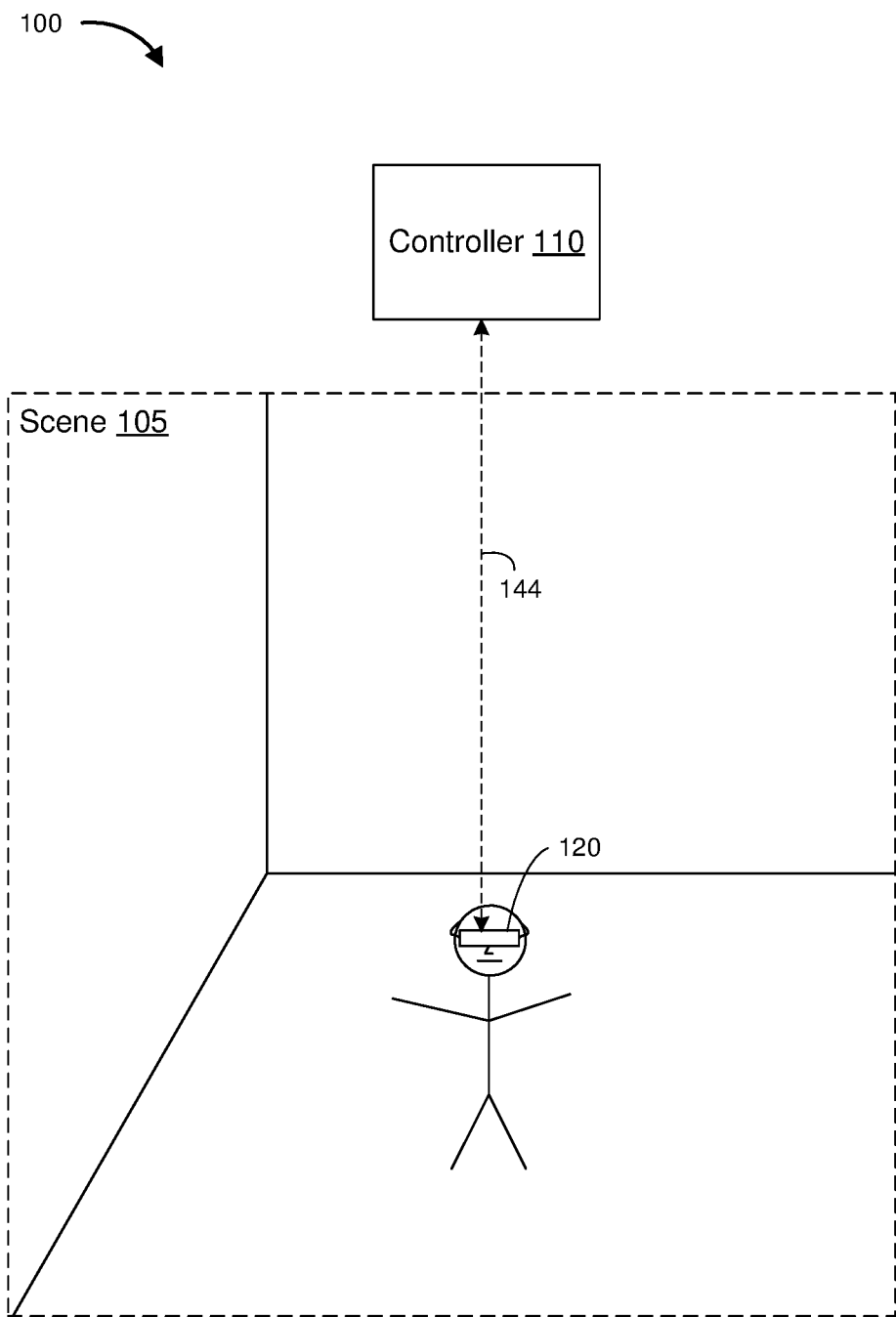
FIG. 1 is a block diagram of an example operating environment in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

SUMMARY

Various implementations disclosed herein include devices, systems, and methods for generating a dense depth map. In various implementations, the method is performed at a device including one or more processors, non-transitory memory, and a scene camera. The method includes capturing, from a first perspective, a first image of a scene and capturing, from a second perspective different than the first perspective, a second image of the scene, the second image including a plurality of second pixels having a respective plurality of second pixel values. The method includes generating, based on the first image and the second image, a first depth map of the second image including, for each of a subset of the plurality of second pixels, a depth of the scene for the respective second pixel. The method includes generating, based on the first depth map of the second image and the respective plurality of second pixel values, a second depth map of the second image including, for each of the respective plurality of second pixels, a depth of the scene for the respective pixel. The method includes capturing a third image of the scene, the third image including a plurality of third pixels having a respective plurality of third pixel values. The method includes generating, based on the second depth map and the third image, a first depth map of the third image including, for each of a subset of the plurality of third pixels, a depth of the scene for the respective third pixel.

In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes:

one or more processors, a non-transitory memory, and means for performing or causing performance of any of the methods described herein.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

In various implementations, a device surveys a scene using a scene camera and generates a depth map indicating the depth from the scene camera to various objects and/or surfaces within the scene represented by an image captured by the scene camera. This depth information can be used in a variety of applications, e.g., to detect real objects in the scene or place virtual objects in the scene. Increasing the accuracy and amount of this depth information improves the user experience of such applications.

FIG. 1 is a block diagram of an example operating environment 100 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the operating environment 100 includes a controller 110 and an HMD 120.

In some implementations, the controller 110 is configured to manage and coordinate a CGR experience for the user. In some implementations, the controller 110 includes a suitable combination of software, firmware, and/or hardware. The controller 110 is described in greater detail below with respect to FIG. 2. In some implementations, the controller 110 is a computing device that is local or remote relative to the scene 105. For example, the controller 110 is a local server located within the scene 105. In another example, the controller 110 is a remote server located outside of the scene 105 (e.g., a cloud server, central server, etc.). In various implementations, the scene 105 is a physical environment. In some implementations, the controller 110 is communicatively coupled with the HMD 120 via one or more wired or wireless communication channels 144 (e.g., BLUETOOTH, IEEE 802.11x, IEEE 802.16x, IEEE 802.3x, etc.). In another example, the controller 110 is included within the enclosure of HMD 120.

In some implementations, the HMD 120 is configured to provide the CGR experience to the user. In some implementations, the HMD 120 includes a suitable combination of software, firmware, and/or hardware. The HMD 120 is described in greater detail below with respect to FIG. 3. In some implementations, the functionalities of the controller 110 are provided by and/or combined with the HMD 120.

According to some implementations, the HMD 120 provides a CGR experience to the user while the user is virtually and/or physically present within the scene 105. In some implementations, while presenting an AR experience, the HMD 120 is configured to present AR content (e.g., one or more virtual objects) and to enable optical see-through of the scene 105. In some implementations, while presenting an AR experience, the HMD 120 is configured to present AR content (e.g., one or more virtual objects) overlaid or otherwise combined with images or portions thereof captured by the scene camera of HMD 120. In some implementations, while presenting AV content, the HMD 120 is configured to present elements of the real world, or representations thereof, combined with or superimposed over a user's view of a computer-simulated environment. In some implementations, while presenting a VR experience, the HMD 120 is configured to present VR content.

In some implementations, the user wears the HMD 120 on his/her head. As such, the HMD 120 includes one or more CGR displays provided to display the CGR content. For example, in various implementations, the HMD 120 encloses the field-of-view of the user. In some implementations, the HMD 120 is replaced with a handheld device (such as a smartphone or tablet) configured to present CGR content, and rather than wearing the HMD 120 the user holds the device with a display directed towards the field-of-view of the user and a camera directed towards the scene 105. In some implementations, the handheld device can be placed within an enclosure that can be worn on the head of the user. In some implementations, the HMD 120 is replaced with a CGR chamber, enclosure, or room configured to present CGR content in which the user does not wear or hold the HMD 120.

Figure 2:
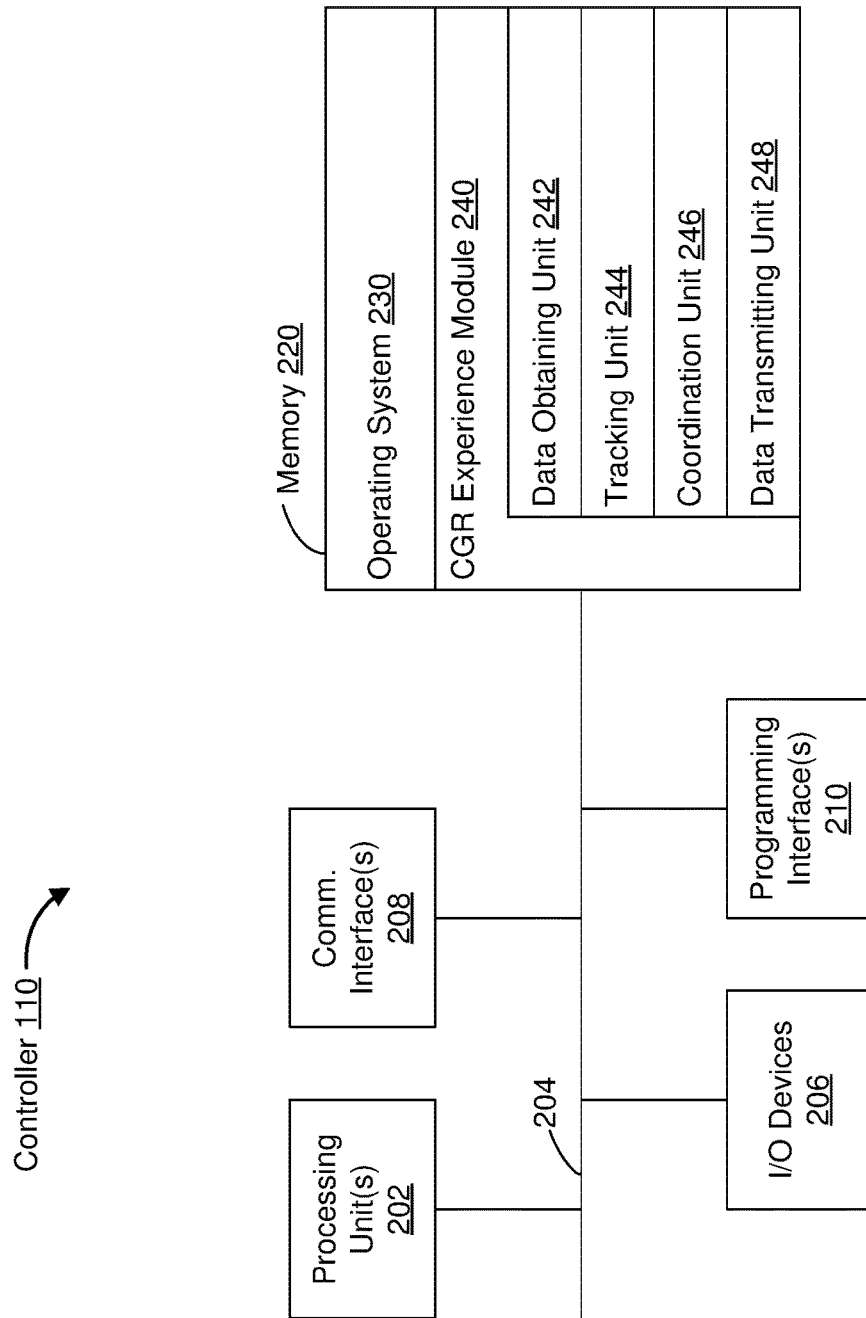
FIG. 2 is a block diagram of an example controller in accordance with some implementations.

FIG. 2 is a block diagram of an example of the controller 110 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the controller 110 includes one or more processing units 202 (e.g., microprocessors, application-specific integrated-circuits (ASICs), field-programmable gate arrays (FPGAs), graphics processing units (GPUs), central processing units (CPUs), processing cores, and/or the like), one or more input/output (I/O) devices 206, one or more communication interfaces 208 (e.g., universal serial bus (USB), FIREWIRE, THUNDERBOLT, IEEE 802.3x, IEEE 802.11x, IEEE 802.16x, global system for mobile communications (GSM), code division multiple access (CDMA), time division multiple access (TDMA), global positioning system (GPS), infrared (IR), BLUETOOTH, ZIGBEE, and/or the like type interface), one or more programming (e.g., I/O) interfaces 210, a memory 220, and one or more communication buses 204 for interconnecting these and various other components.

In some implementations, the one or more communication buses 204 include circuitry that interconnects and controls communications between system components. In some implementations, the one or more I/O devices 206 include at least one of a keyboard, a mouse, a touchpad, a joystick, one or more microphones, one or more speakers, one or more image sensors, one or more displays, and/or the like.

The memory 220 includes high-speed random-access memory, such as dynamic random-access memory (DRAM), static random-access memory (SRAM), double-data-rate random-access memory (DDR RAM), or other random-access solid-state memory devices. In some implementations, the memory 220 includes non-volatile memory, such as one or more magnetic disk storage devices, optical disk storage devices, flash memory devices, or other non-volatile solid-state storage devices. The memory 220 optionally includes one or more storage devices remotely located from the one or more processing units 202. The memory 220 comprises a non-transitory computer readable storage medium. In some implementations, the memory 220 or the non-transitory computer readable storage medium of the memory 220 stores the following programs, modules and data structures, or a subset thereof including an optional operating system 230 and a CGR experience module 240.

The operating system 230 includes procedures for handling various basic system services and for performing hardware dependent tasks. In some implementations, the CGR experience module 240 is configured to manage and coordinate one or more CGR experiences for one or more users (e.g., a single CGR experience for one or more users, or multiple CGR experiences for respective groups of one or more users). To that end, in various implementations, the CGR experience module 240 includes a data obtaining unit 242, a tracking unit 244, a coordination unit 246, and a data transmitting unit 248.

In some implementations, the data obtaining unit 242 is configured to obtain data (e.g., presentation data, interaction data, sensor data, location data, etc.) from at least the HMD 120. To that end, in various implementations, the data obtaining unit 242 includes instructions and/or logic therefor, and heuristics and metadata therefor.

In some implementations, the tracking unit 244 is configured to map the scene 105 and to track the position/location of at least the HMD 120 with respect to the scene 105. To that end, in various implementations, the tracking unit 244 includes instructions and/or logic therefor, and heuristics and metadata therefor.

In some implementations, the coordination unit 246 is configured to manage and coordinate the CGR experience presented to the user by the HMD 120. To that end, in various implementations, the coordination unit 246 includes instructions and/or logic therefor, and heuristics and metadata therefor.

In some implementations, the data transmitting unit 248 is configured to transmit data (e.g., presentation data, location data, etc.) to at least the HMD 120. To that end, in various implementations, the data transmitting unit 248 includes instructions and/or logic therefor, and heuristics and metadata therefor.

Although the data obtaining unit 242, the tracking unit 244, the coordination unit 246, and the data transmitting unit 248 are shown as residing on a single device (e.g., the controller 110), it should be understood that in other implementations, any combination of the data obtaining unit 242, the tracking unit 244, the coordination unit 246, and the data transmitting unit 248 may be located in separate computing devices.

Moreover, FIG. 2 is intended more as functional description of the various features that may be present in a particular implementation as opposed to a structural schematic of the implementations described herein. As recognized by those of ordinary skill in the art, items shown separately could be combined and some items could be separated. For example, some functional modules shown separately in FIG. 2 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

Figure 3:
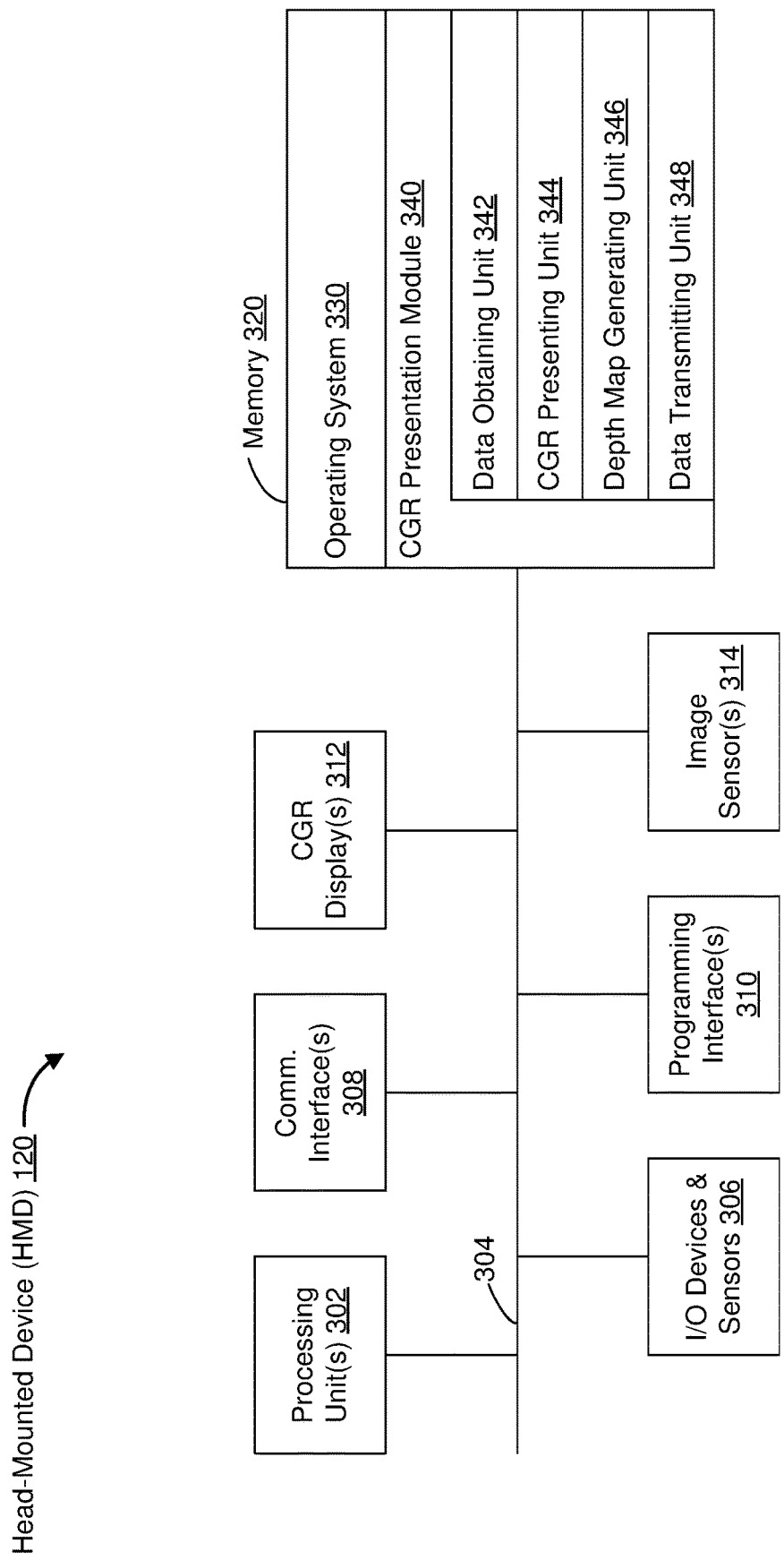
FIG. 3 is a block diagram of an example HMD in accordance with some implementations.

FIG. 3 is a block diagram of an example of the HMD 120 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the HMD 120 includes one or more processing units 302 (e.g., microprocessors, ASICs, FPGAs, GPUs, CPUs, processing cores, and/or the like), one or more input/output (I/O) devices and sensors 306, one or more communication interfaces 308 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, and/or the like type interface), one or more programming (e.g., I/O) interfaces 310, one or more CGR displays 312, one or more optional interior and/or exterior facing image sensors 314, a memory 320, and one or more communication buses 304 for interconnecting these and various other components.

In some implementations, the one or more communication buses 304 include circuitry that interconnects and controls communications between system components. In some implementations, the one or more I/O devices and sensors 306 include at least one of an inertial measurement unit (IMU), an accelerometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), and/or the like.

In some implementations, the one or more CGR displays 312 are configured to provide the CGR experience to the user. In some implementations, the one or more CGR displays 312 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electro-mechanical system (MEMS), and/or the like display types. In some implementations, the one or more CGR displays 312 correspond to diffractive, reflective, polarized, holographic, etc. waveguide displays. For example, the HMD 120 includes a single CGR display. In another example, the HMD 120 includes a CGR display for each eye of the user. In some implementations, the one or more CGR displays 312 are capable of presenting AR and VR content. In some implementations, the one or more CGR displays 312 are capable of presenting AR or VR content.

In some implementations, the one or more image sensors 314 are configured to obtain image data that corresponds to at least a portion of the face of the user that includes the eyes of the user (any may be referred to as an eye-tracking camera). In some implementations, the one or more image sensors 314 are configured to be forward-facing so as to obtain image data that corresponds to the scene as would be viewed by the user if the HMD 120 was not present (and may be referred to as a scene camera). The one or more optional image sensors 314 can include one or more RGB cameras (e.g., with a complimentary metal-oxide-semiconductor (CMOS) image sensor or a charge-coupled device (CCD) image sensor), one or more infrared (IR) cameras, one or more event-based cameras, and/or the like.

The memory 320 includes high-speed random-access memory, such as DRAM, SRAM, DDR RAM, or other random-access solid-state memory devices. In some implementations, the memory 320 includes non-volatile memory, such as one or more magnetic disk storage devices, optical disk storage devices, flash memory devices, or other non-volatile solid-state storage devices. The memory 320 optionally includes one or more storage devices remotely located from the one or more processing units 302. The memory 320 comprises a non-transitory computer readable storage medium. In some implementations, the memory 320 or the non-transitory computer readable storage medium of the memory 320 stores the following programs, modules and data structures, or a subset thereof including an optional operating system 330 and a CGR presentation module 340.

The operating system 330 includes procedures for handling various basic system services and for performing hardware dependent tasks. In some implementations, the CGR presentation module 340 is configured to present CGR content to the user via the one or more CGR displays 312. To that end, in various implementations, the CGR presentation module 340 includes a data obtaining unit 342, a CGR presenting unit 344, a depth map generating unit 346, and a data transmitting unit 348.

In some implementations, the data obtaining unit 342 is configured to obtain data (e.g., presentation data, interaction data, sensor data, location data, etc.) from at least the controller 110. To that end, in various implementations, the data obtaining unit 342 includes instructions and/or logic therefor, and heuristics and metadata therefor.

In some implementations, the CGR presenting unit 344 is configured to present CGR content via the one or more CGR displays 312. To that end, in various implementations, the CGR presenting unit 344 includes instructions and/or logic therefor, and heuristics and metadata therefor.

In some implementations, the depth map generating unit 346 is configured to generate one or more depth maps of a scene based on one or more images of the scene (e.g., captured using a scene camera of the one or more image sensors 314). To that end, in various implementations, the depth map generating unit 346 includes instructions and/or logic therefor, and heuristics and metadata therefor.

In some implementations, the data transmitting unit 348 is configured to transmit data (e.g., presentation data, location data, etc.) to at least the controller 110. To that end, in various implementations, the data transmitting unit 348 includes instructions and/or logic therefor, and heuristics and metadata therefor.

Although the data obtaining unit 342, the CGR presenting unit 344, the depth map generating unit 346, and the data transmitting unit 348 are shown as residing on a single device (e.g., the HMD 120), it should be understood that in other implementations, any combination of the data obtaining unit 342, the CGR presenting unit 344, the depth map generating unit 346, and the data transmitting unit 348 may be located in separate computing devices.

Moreover, FIG. 3 is intended more as a functional description of the various features that could be present in a particular implementation as opposed to a structural schematic of the implementations described herein. As recognized by those of ordinary skill in the art, items shown separately could be combined and some items could be separated. For example, some functional modules shown separately in FIG. 3 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

Figure 4:
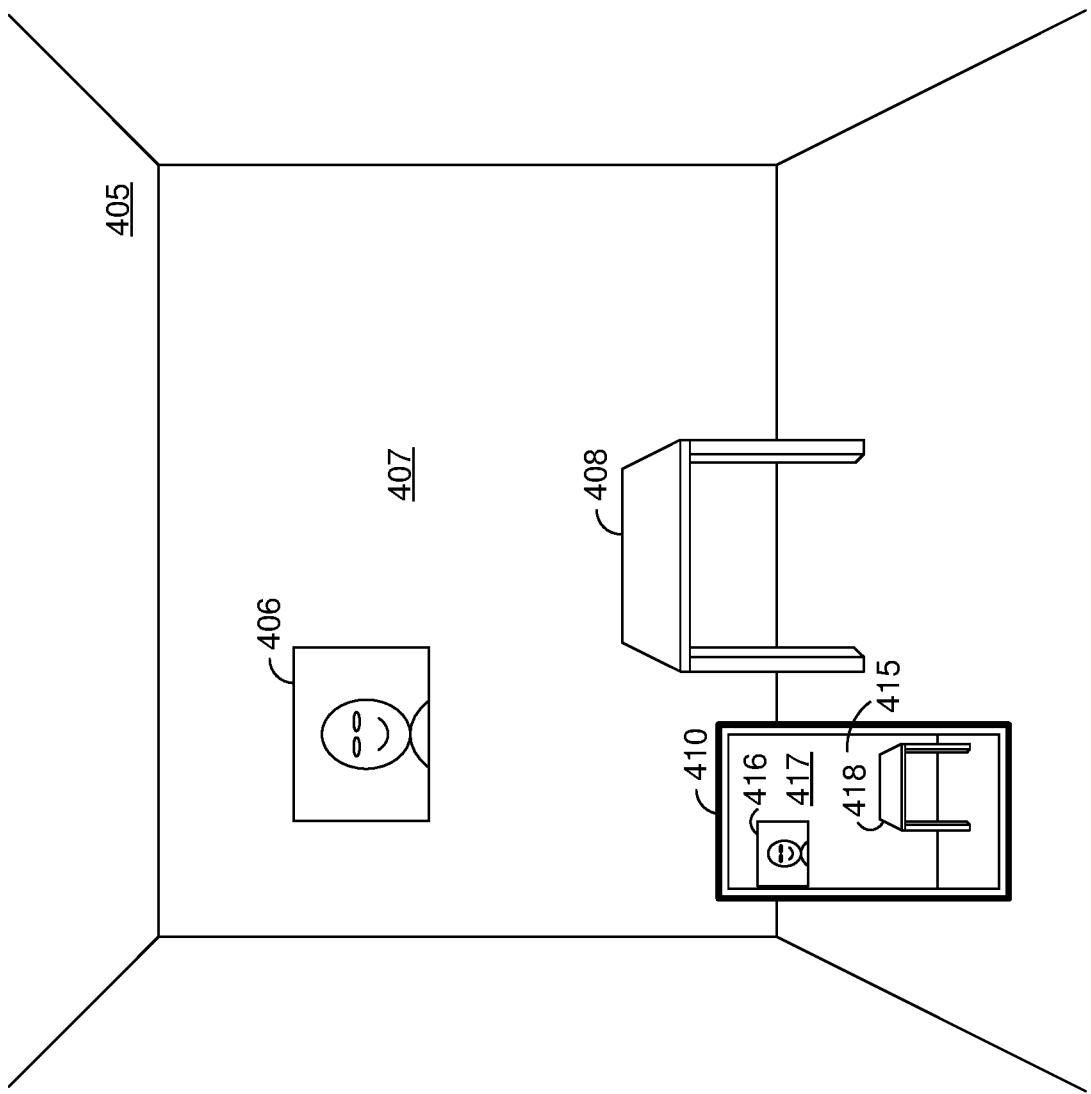
FIG. 4 illustrates a scene with a handheld electronic device surveying the scene.

FIG. 4 illustrates a scene 405 with an electronic device, such as an HMD (e.g., HMD 120) or handheld electronic device 410, surveying the scene 405. The scene 405 includes a picture 406 hanging on a wall 407 and a table 408.

The handheld electronic device 410 displays, on a display, a representation of the scene 415 including a representation of the picture 416 hanging on a representation of the wall 417 and a representation of the table 418. In various implementations, the representation of the scene 415 is generated based on an image of the scene captured with a scene camera of the handheld electronic device 410 having a field-of-view directed toward the scene 405.

In various implementations, the handheld electronic device 410 includes a single scene camera (or single rear-facing camera disposed on an opposite side of the handheld electronic device as the display). In various implementations, the handheld electronic device 410 includes at least two scene cameras (or at least two rear-facing cameras disposed on an opposite side of the handheld electronic device as the display).

Figure 5A:
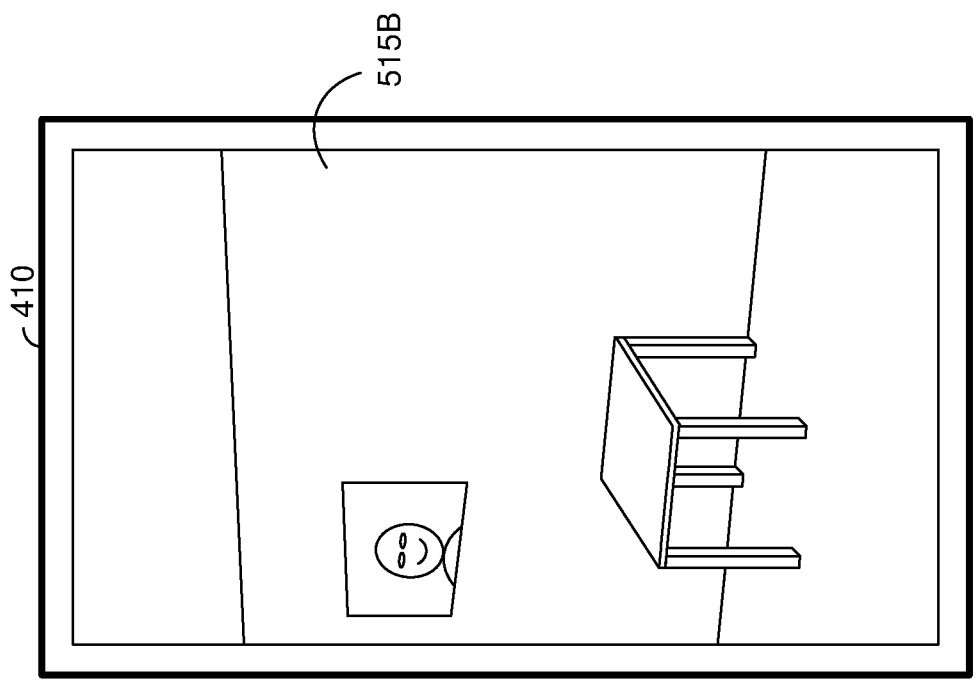
FIG. 5A illustrates the handheld electronic device of FIG. 4 displaying a first image of the scene captured from a first perspective.
Figure 5B:
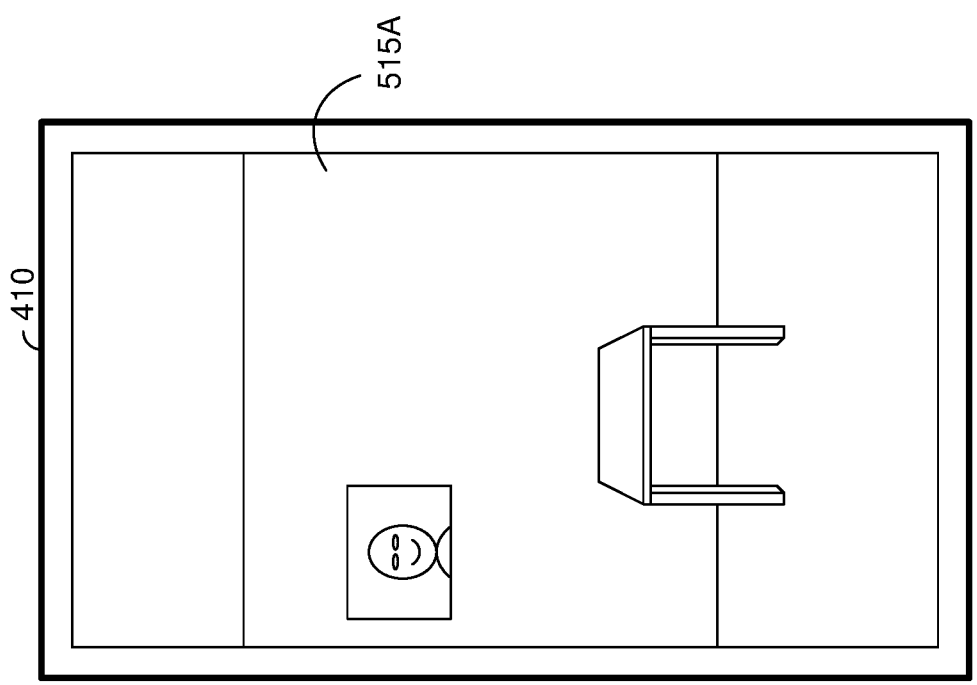
FIG. 5B illustrates the handheld electronic device of FIG. 4 displaying a second image of the scene captured from a second perspective different from the first perspective.

FIG. 5A illustrates the handheld electronic device 410 displaying a first image 515A of the scene 405 captured from a first perspective. FIG. 5B illustrates the handheld electronic device 410 displaying a second image 515B of the scene 405 captured from a second perspective different from the first perspective.

In various implementations, the first image 515A and the second image 515B are captured by the same camera at different times (e.g., by the same single scene camera at two different times when the handheld electronic device 410 is moved between the two times). In various implementations, the first image 515A and the second image 515B are captured by different cameras at the same time (e.g., by two scene cameras).

An image includes a matrix of pixels, each pixel having a corresponding pixel value and a corresponding pixel location. In various implementations, the pixel values range from 0 to 255. In various implementations, each pixel value is a color triplet including three values corresponding to three color channels. For example, in one implementation, an image is an RGB image and each pixel value includes a red value, a green value, and a blue value. As another example, in one implementation, an image is a YUV image and each pixel value includes a luminance value and two chroma values. In various implementations, the image is a YUV444 image in which each chroma value is associated with one pixel. In various implementations, the image is a YUV420 image in which each chroma value is associated with a 2×2 block of pixels (e.g., the chroma values are downsampled). While specific image formats are provided, it should be appreciated that pixel formats may be used.

Accordingly, in various implementations, the first image 515A includes a plurality of first pixels having a respective plurality of first pixel values and the second image 515B includes a plurality of second pixels have a respective plurality of second pixel values.

The handheld electronic device 410, based on the first image 515A and second image 515B, generates a sparse depth map of the second image 515B using one or more of a variety of techniques. The sparse depth map of the second image 515B includes, for each of a subset of the plurality of second pixels, a depth of the scene 405 for the respective second pixel. The depth of the scene 405 for a respective second pixel indicates a distance from the scene camera that captured the second image 515B to an object in the scene represented at the respective second pixel.

In various implementations, the handheld electronic device 410 includes two scene cameras which respectively capture the first image 515A and the second image 515B. Thus, in various implementations, the sparse depth map of the second image 515B is generated based on the first image 515A, the second image 515B, and stored information concerning the distance between two scene cameras. For example, in various implementations, the handheld electronic device 410 detects a feature in the first image 515A, such as the corner of the table 418, at a first pixel location of the first image 515A and detects the same feature at a second pixel location of the second image 515B. Based on the stored information concerning the distance between the two scene cameras and the difference between the first pixel location and the second pixel location, the distance from the scene cameras to the feature can be determined using geometric algorithms.

In various implementations, the sparse depth map of the second image 515B is generated based on the first image 515A, the second image 515B, and inertial measurement data generated by an inertial measurement unit (IMU) of the handheld electronic device 410. Accordingly, in various implementations, the sparse depth map of the second image 515B is generated according to a visual inertial odometry (VIO) algorithm. For example, in various implementations, the handheld electronic device 410 detects a feature in the first image 515A, such as the corner of the table 418, at a first pixel location of the first image 515A and detects the same feature at a second pixel location of the second image 515B. Based on the motion of the handheld electronic device 410 as indicated by the inertial data and the difference between the first pixel location and the second pixel location, the distance from the scene camera to the feature can be determined using geometric algorithms.

Accordingly, in various implementations, the sparse depth map of the second image 515B includes a depth of the scene 405 for each of a plurality of second pixels at which a corresponding feature is detected. In various implementations, each feature corresponds to a surface of an object in the scene 405, such as the table 408, the wall 417, or the picture 416. Typically, the number of detected features is much less than the number of pixels of the second image 515B. For example, in various implementations, the sparse depth map of the second image 515B includes depths for less than 10% of the second pixels, less than 1% of the second pixels, or less than 0.1% of the second pixels.

Thus, in various implementations, the handheld electronic device 410 generates a dense depth map of the second image 515B based on the sparse depth map of the second image 515B and the respective plurality of second pixel values of the second image 515B. In various implementations, the dense depth map of the second image 515B includes a depth of the scene for each of the second pixels. In various implementations, the dense depth map of the second image 515B includes a depth of the scene for less than all of the second pixels, but for more pixels than the sparse depth map. For example, in various implementations, the dense depth map of the second image 515B includes depths for two times, three times, ten times, or a hundred times as many pixel locations as the sparse depth map of the second image 515B.

In various implementations, the dense depth map of the second image 515B is generated by applying a neural network to the sparse depth map of the second image and the respective plurality of second pixel values. In various implementations, the neural network includes an interconnected group of nodes. In various implementation, each node includes an artificial neuron that implements a mathematical function in which each input value is weighted according to a set of weights and the sum of the weighted inputs is passed through an activation function, typically a non-linear function such as a sigmoid, piecewise linear function, or step function, to produce an output value. In various implementations, the neural network is trained on training data to set the weights.

In various implementations, the neural network includes a deep learning neural network. Accordingly, in some implementations, the neural network includes a plurality of layers (of nodes) between an input layer (of nodes) and an output layer (of nodes). In various implementations, the neural network receives, as inputs, the sparse depth map including a depth value for each of a subset of the second pixels and the second pixel values for each of the second pixels. In various implementations, the neural network provides, as outputs, the dense depth map including a depth value for each of the second pixels.

In various implementations, jitter is added to the sparse depth map before providing the sparse depth map to the neural network. In various implementations, the jitter added to the sparse depth map is based on a noise model of the sparse depth map based on the generating algorithm. For example, in various implementations, the sparse depth map is generated according to a VIO algorithm that provides, for each depth, a confidence measurement and the amount of jitter added to the depth of the sparse depth map is based on the confidence measurement.

Figure 6:
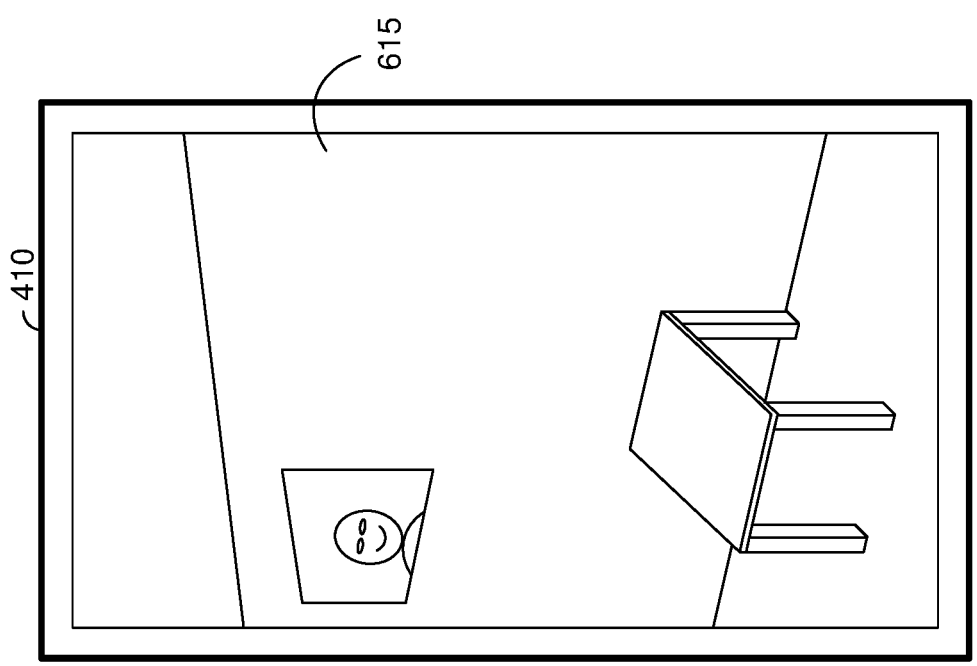
FIG. 6 illustrates the handheld electronic device of FIG. 4 displaying a third image of the scene captured from a third perspective.

FIG. 6 illustrates the handheld electronic device 410 displaying a third image 615. In various implementations, the third image 615 includes a plurality of third pixels having a respective plurality of third pixel values. In various implementations, the third image 615 is captured (e.g., by a single scene camera of the handheld electronic device 410 or one or multiple scene cameras of the handheld electronic device 410) at a later time than the first image 515A and/or the second image 515B.

In various implementations, the dense depth map of the second image 515B is fed back for use in generating a sparse depth map of the third image 615. Accordingly, in various implementations, the handheld electronic device 410 generates, based on the dense depth map of the second image 515B and the third image 615, a sparse depth map of the third image 615 including, for each of a subset of the plurality of third pixels, a depth of the scene for the respective third pixel. In various implementations, the sparse depth map of the third image 615 is further based on the first image 515A and/or the second image 515B. In various implementations, the sparse depth map of the third image 615 is further based on inertial data generated by the IMU. Thus, in various implementations, the sparse depth map of the third image 615 is generated using a VIO algorithm.

In various implementations, the dense depth map of the second image 515B is used to generate the sparse depth map of the third image 615 in a variety of ways. For example, in various implementations, the dense depth map of the second image 515B is used to detect features in the third image 615 (and one or more of the first image 515A and the second image 515B). In various implementations, the dense depth map of the second image 515B is used to increase respective confidence measurements associated with respective depth values of the sparse depth map of the third image 615. In various implementations, the dense depth map of the second image 515B is used to resolve ambiguities in potential depth values for particular third pixels of the sparse depth map of the third image 615. In various implementations, the depth values of the dense depth map of the second image 515B are averaged with (or otherwise incorporated into) depth values of the sparse depth map of the third image 615.

In various implementations, the handheld electronic device 410 further generates a dense depth map of the third image 615 in substantially the same way as the dense depth map of the second image 515B is generated. For example, in various implementations, the sparse depth map of the third image 615 and the respective third pixel values are input into a neural network (e.g., a deep learning neural network) which outputs the dense depth map of the third image 615. In various implementations, the dense depth map of the third image 615 includes, for each of the respective plurality of third pixels, a depth of the scene for the respective pixel.

In various implementations, the handheld electronic device 410 continues to feedback dense depth maps to generate subsequent sparse depth maps for subsequent images (e.g., a fourth image, a fifth image, a sixth image, etc.) This feedback increases the accuracy of both the sparse depth maps and the dense depth maps for subsequent images.

In various implementations, the dense depth map is used to apply a depth-of-field effect to a subsequent image (e.g., the third image) based on the dense depth map of the subsequent image. For example, in various implementations, background pixels (e.g., those with a depth greater than a threshold) are blurred resulting in a portrait effect. As another example, in various implementations, lighting effects can be applied to the subsequent image based on the dense depth map. In various implementations, the dense depth map is used to detect an object in a subsequent image (e.g., the third image) based on the dense depth map. For example, depth-based facial recognition may be performed on the image.

FIG. 7 is a flowchart representation of a method 700 of generating a depth map in accordance with some implementations. In various implementations, the method 700 is performed by a device with one or more processors, non-transitory memory, and a camera (e.g., the HMD 120 FIG. 3 or handheld electronic device 410 as described above with respect to FIGS. 4-6). In some implementations, the method 700 is performed by processing logic, including hardware, firmware, software, or a combination thereof. In some implementations, the method 700 is performed by a processor executing instructions (e.g., code) stored in a non-transitory computer-readable medium (e.g., a memory). Briefly, in some circumstances, the method 700 includes: generating a dense depth map of an image based on pixel values of the image and a sparse depth map of the image and generating a sparse depth map of a subsequent image based on the dense depth map.

The method 700 begins, in block 710, with the device capturing, from a first perspective, a first image of a scene. In various implementations, the first image includes a plurality of first pixels having a respective plurality of first pixel values. For example, FIG. 5A illustrates a first image 515A of a scene 405 from a first perspective.

The method 700 continues, in block 720, with the device capturing, from a second perspective different than the first perspective, a second image of the scene. In various implementations, the second image includes a plurality of second pixels having a respective plurality of second pixel values. For example, FIG. 5B illustrates a second image 515B of a scene 405 from a second perspective.

In various implementations, the first image is captured (in block 710) and the second image is captured (in block 720) with different cameras at the same time. Accordingly, the method 700 can be performed by a device with two (or more) scene cameras, such as a pair of stereoscopic cameras. In various implementations, the first image is captured (in block 710) and the second image is captured (in block 720) with the same camera at different times. Accordingly, the method 700 can be performed by a device with only a single scene camera (or a single front-facing camera and/or a single rear-facing camera). Thus, pre-existing devices without multiple cameras can perform the method to obtain a high-quality depth map and perform operations based on such a depth map, such as portrait effects or accurate object detection.

The method 700 continues, in block 730, with the device generating, based on the first image and the second image, a first depth map (e.g., a sparse depth map) of the second image including, for each of a subset of the plurality of second pixels, a depth of the scene for the respective second pixel. In various implementations, the first depth map of the second image is further based on inertial measurement data generated by an inertial measurement unit (IMU) of the device. Accordingly, in various implementations, the first depth map of the second image is generated according to a visual inertial odometry (VIO) algorithm.

The method 700 continues, in block 740, with the device generating, based on the first depth map of the second image and the respective plurality of second pixel values, a second depth map (e.g., a dense depth map) of the second image including, for each of the respective plurality of second pixels, a depth of the scene for the respective second pixel. In various implementations, the second depth map of the second image includes a depth of the scene for each second pixel of the second image. In various implementations, the second depth map of the second image includes a depth of the scene for less than all of the second pixels of the second image, but for more pixels than the first depth map. For example, in various implementations, the second depth map of the second image includes depths for two times, three times, ten times, or a hundred times as many pixel locations as the first depth map of the second image.

In various implementations, generating the second depth map of the second image includes applying a neural network to the first depth map of the second image and the respective plurality of second pixel values. In various implementations, the neural network includes a deep learning neural network. In various implementations, generating the second depth map of the second image includes applying jitter to the first depth map of the second image based on a noise model. For example, in various implementations, jitter is added to the first depth map of the second image before providing the first depth map of the second image to the neural network.

The method 700 continues, in block 750, with the device capturing a third image of the scene. In various implementations, the third image includes a plurality of third pixels having a respective plurality of third pixel values. For example, FIG. 6 illustrates a third image 615 of the scene 405 from a third perspective. In various implementations, the first image is captured (in block 710), the second image is captured (in block 720), and the third image is captured (in block 750) with the same camera at different times.

The method 700 continues, in block 760, with the device generating, based on the second depth map of the second image and the third image, a first depth map (e.g., a sparse depth map) of the third image including, for each of a subset of the plurality of third pixels, a depth of the scene for the respective third pixel. In various implementations, generating the first depth map of the third image is further based on at least one of the first image or the second image. In various implementations, generating the first depth map of the third image is further based on inertial data generated by an inertial measurement unit (IMU) of the device.

Accordingly, the first depth map of the third image is based on the second depth map of the second image. In various implementations, the second depth map of the second image is used to generate the first depth map of the third image in a variety of ways. For example, in various implementations, the second depth map of the second image is used to detect features in the third image (and one or more of the first image and the second image). In various implementations, the second depth map of the second image is used to increase respective confidence measurements associated with respective depth values of the first depth map of the third image. In various implementations, the second depth map of the second image is used to resolve ambiguities in potential depth values for particular third pixels of the first depth map of the third image. In various implementations, the depth values of the second depth map of the second image are averaged with (or otherwise incorporated into) depth values of the first depth map of the third image.

In various implementations, the method 700 further includes generating, based on the first depth map of the third image and the respective plurality of third pixel values, a second depth map (e.g., a dense depth map) of the third image including, for each of the respective plurality of third pixels, a depth of the scene for the respective pixel. In various implementations, the second depth map for the third image is generated in a substantially similar manner as the second depth map for the second image is generated (in block 740).

The device can use the second depth map of the third image in variety of ways to process the third image. For example, in various implementations, the method 700 further includes applying a depth-of-field effect to the third image based on the second depth map of the third image. As another example, in various implementations, the method 700 further includes detecting an object in the third image based on the second depth map of the third image.

In various implementations, the method 700 loops, from block 760, to block 740, where second depth maps for an image are generated based on first depth maps for the image and used to generate first depth maps for subsequently captured images.

Thus, in various implementations, the method 700 feeds back second depth maps to generate subsequent first depth maps for subsequent images (e.g., a fourth image, a fifth image, a sixth image, etc.) This feedback increases the accuracy of both the first depth maps and the second depth maps for subsequent images. The method 700 thus provides accurate depth maps that can be used to apply a depth-of-field effect, a lighting effect, or enhanced object detection. Further, as noted above, the method 700 can advantageously be performed by an electronic device with two scene cameras or only one scene camera.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
    capturing, from a first perspective, a first image of a scene;
    capturing, from a second perspective different than the first perspective, a second image of the scene, the second image including a plurality of second pixels having a respective plurality of second pixel values;
    generating, based on the first image and the second image, a first depth map of the second image including, for each of a subset of the plurality of second pixels, a depth of the scene for the respective second pixel;
    generating, based on the first depth map of the second image and the respective plurality of second pixel values, a second depth map of the second image including, for each of the respective plurality of second pixels, a depth of the scene for the respective second pixel;
    capturing a third image of the scene, the third image including a plurality of third pixels having a respective plurality of third pixel values; and generating, based on the second depth map of the second image and the third image, a first depth map of the third image including, for each of a subset of the plurality of third pixels, a depth of the scene for the respective third pixel.

2. The method of claim 1, wherein generating the first depth map of the third image is further based on inertial data generated by an inertial measurement unit.

3. The method of claim 1, wherein generating the first depth map of the third image is further based on at least one of the first image or the second image.

4. The method of claim 1, wherein the first image, second image, and third image are captured with the same camera at different times.

5. The method of claim 1 wherein the first image and second image are captured with different cameras at the same time.

6. The method of claim 1, wherein generating the second depth map of the second image includes applying a neural network to the first depth map of the second image and the respective plurality of second pixel values.

7. The method of claim 6, wherein the neural network includes a deep learning neural network.

8. The method of claim 1, wherein generating the second depth map of the second image includes applying jitter to the first depth map of the second image based on a noise model.

9. The method claim 1, further comprising:
generating, based on the first depth map of the third image and the respective plurality of third pixel values, a second depth map of the third image including, for each of the respective plurality of third pixels, a depth of the scene for the respective pixel.

10. The method of claim 9, further comprising applying a depth-of-field effect to the third image based on the second depth map of the third image.

11. The method of claim 9, further comprising detecting an object in the third image based on the second depth map of the third image.

12. A device comprising:
one or more scene cameras; and
one or more processors to:
capture, from a first perspective using the one or more scene cameras;
capture, from a second perspective different than the first perspective using the one or more scene cameras, a second image of the scene, the second image including a plurality of second pixels having a respective plurality of second pixel values;
generate, based on the first image and the second image, a first depth map of the second image including, for each of a subset of the plurality of second pixels, a depth of the scene for the respective second pixel;
generate, based on the first depth map of the second image and the respective plurality of second pixel values, a second depth map of the second image including, for each of the respective plurality of second pixels, a depth of the scene for the respective second pixel;
capture, using the one or more scene cameras, a third image of the scene, the third image including a plurality of third pixels having a respective plurality of third pixel values; and
generate, based on the second depth map of the second image and the third image, a first depth map of the third image including, for each of a subset of the plurality of third pixels, a depth of the scene for the respective third pixel.

13. The device of claim 12, further comprising an inertial measurement unit, wherein the one or more processors generate the first depth map of the third image further based on inertial data generated by the inertial measurement unit.

14. The device of claim 12, wherein the one or more processors generate the first depth map of the third image further based on at least one of the first image or the second image.

15. The device of claim 12, wherein the first image, second image, and third image are captured with the same scene camera of the one or more scene cameras at different times.

16. The device of claim 12, wherein the one or more scene cameras include two or more scene cameras, wherein the first image and second image are captured with different ones of the two or more scene cameras at the same time.

17. The device of claim 12, wherein the one or more processors generate the second depth map of the second image by applying a neural network to the first depth map of the second image and the respective plurality of second pixel values.

18. The device of claim 12, wherein the one or more processors are further to:
generate, based on the first depth map of the third image and the respective plurality of third pixel values, a second depth map of the third image including, for each of the respective plurality of third pixels, a depth of the scene for the respective pixel; and
apply a depth-of-field effect to the third image based on the second depth map of the third image.

19. The device of claim 12, wherein the one or more processors are further to
generate, based on the first depth map of the third image and the respective plurality of third pixel values, a second depth map of the third image including, for each of the respective plurality of third pixels, a depth of the scene for the respective pixel; and
detect an object in the third image based on the second depth map of the third image.

20. A non-transitory computer-readable medium having instructions encoded thereon which, when executed by one or more processors of a device including one or more scene cameras, cause the device to:
capture, from a first perspective, a first image of a scene;
capture, from a second perspective different than the first perspective, a second image of the scene, the second image including a plurality of second pixels having a respective plurality of second pixel values;
generate, based on the first image and the second image, a first depth map of the second image including, for each of a subset of the plurality of second pixels, a depth of the scene for the respective second pixel;
generate, based on the first depth map of the second image and the respective plurality of second pixel values, a second depth map of the second image including, for each of the respective plurality of second pixels, a depth of the scene for the respective second pixel;
capture a third image of the scene, the third image including a plurality of third pixels having a respective plurality of third pixel values; and
generate, based on the second depth map of the second image and the third image, a first depth map of the third image including, for each of a subset of the plurality of third pixels, a depth of the scene for the respective third pixel.

* * * * *